United States Patent [19]

Hunt et al.

[11] Patent Number: 4,528,056
[45] Date of Patent: Jul. 9, 1985

[54] CURL FREE REINFORCED PAPER SHEET TECHNIQUE

[75] Inventors: Stuart B. D. Hunt, Lake Forest; Philip B. Chandler, Tinley Park; Thomas L. Harrison, Villa Park, all of Ill.

[73] Assignee: Avery International Corp., Pasadena, Calif.

[21] Appl. No.: 467,269

[22] Filed: Feb. 17, 1983

[51] Int. Cl.³ .............................................. B32B 31/00
[52] U.S. Cl. .................................... 156/253; 156/264; 156/270; 156/324.4; 355/3 SH; 427/285
[58] Field of Search ...................... 156/324.4, 253, 264, 156/270; 355/3 SH; 162/135, 138; 427/179, 284, 285, 286

[56] References Cited

U.S. PATENT DOCUMENTS

| | | | |
|---|---|---|---|
| 3,462,342 | 8/1969 | Cooper et al. | 156/324.4 X |
| 3,682,740 | 8/1972 | Newton | 156/324.4 X |
| 3,713,939 | 1/1973 | Preg | 156/270 |
| 3,958,051 | 5/1976 | Smith | 156/253 X |
| 4,214,933 | 7/1980 | Off et al. | 156/324.4 X |
| 4,354,890 | 10/1982 | Maffey | 156/264 |

Primary Examiner—Thurman K. Page
Attorney, Agent, or Firm—Poms, Smith, Lande & Rose

[57] ABSTRACT

To provide a reinforced paper sheet which has curl-resistant edges so that it will not jam high-speed copier machines, the edges of the paper sheets are reinforced with very thin Mylar strips which are symmetrically mounted on both sides of the edge of the sheet of paper. The strips are preferably about one-half inch wide and may be mounted slightly back from the edge of the sheet of paper. In the manufacturing step, it is desirable that the two strips be applied precisely symmetrically, and preferably simultaneously, so that any stresses are equal and opposite on the two sides of the paper so that the paper resist curling. The Mylar strips may be very thin, such as one-half of a thousandth of an inch in thickness, and the adhesive may be a hot melt type of adhesive which is strictly confined to one side of the Mylar reinforcing strips.

11 Claims, 9 Drawing Figures

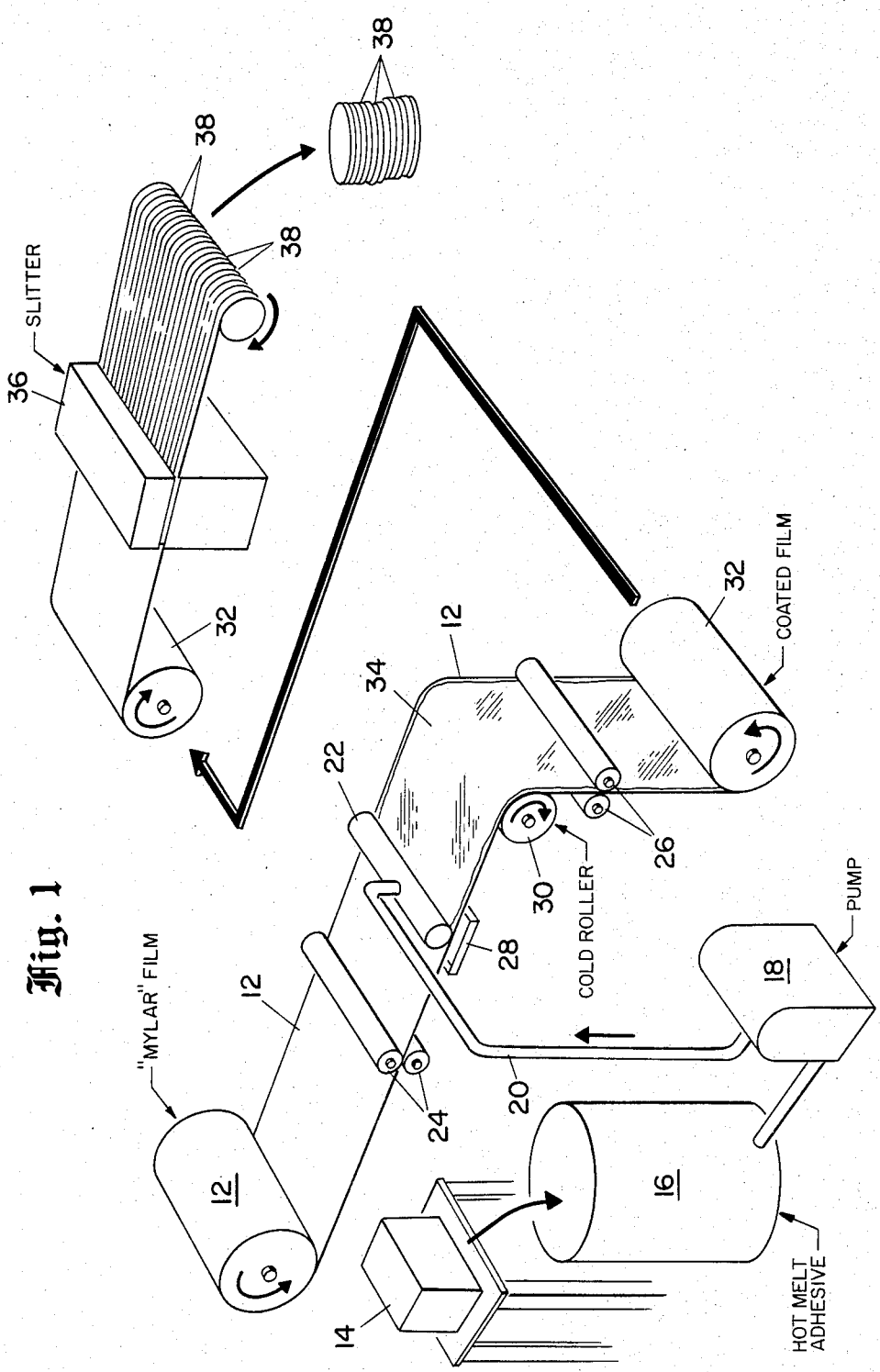

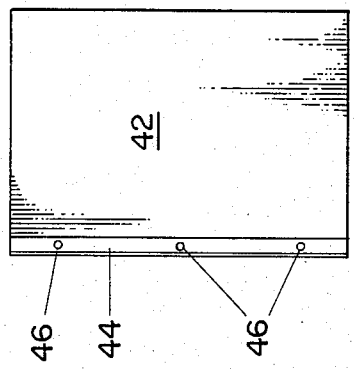
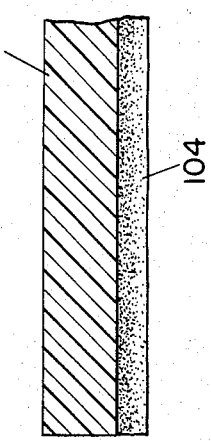
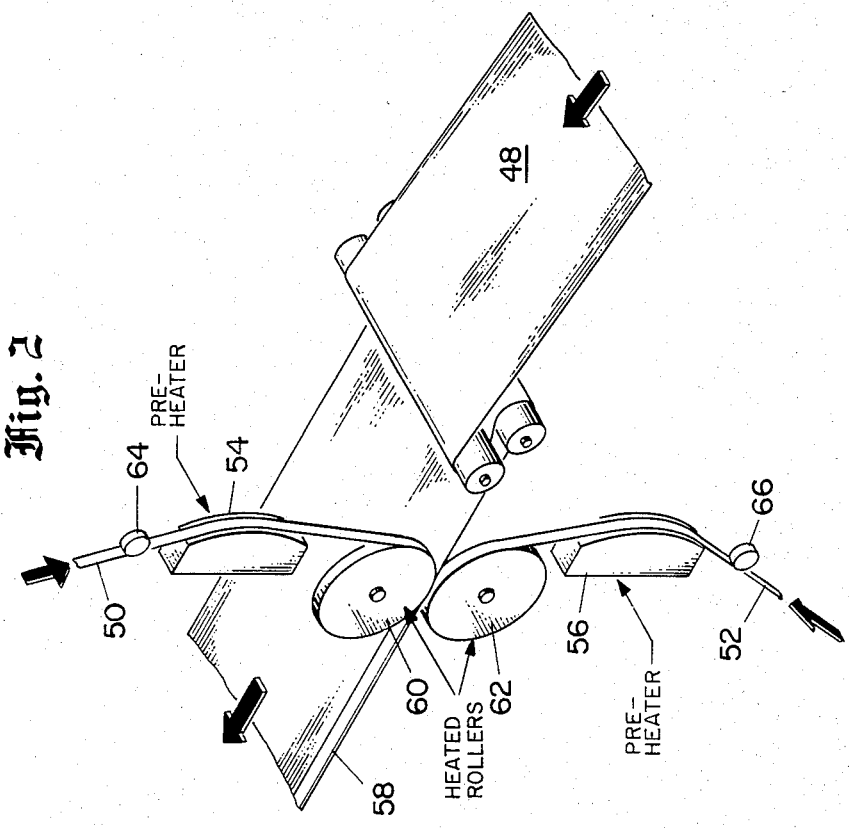

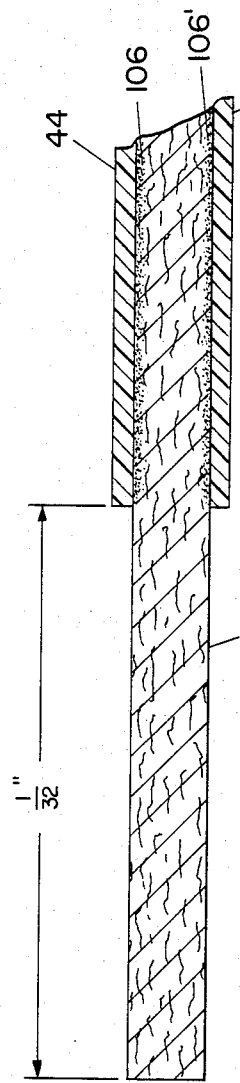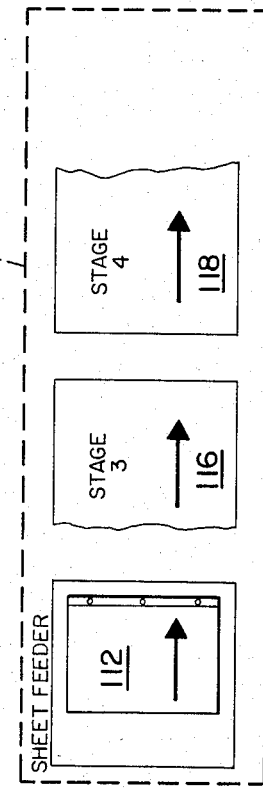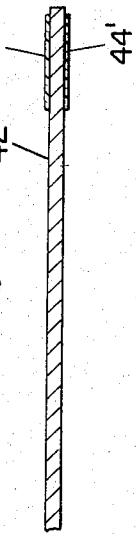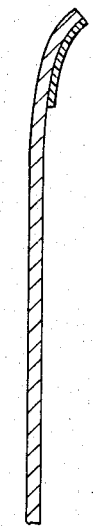

CURL FREE REINFORCED PAPER SHEET TECHNIQUE

FIELD OF THE INVENTION

This invention relates to reinforced sheets of paper for use first in high speed copying machines and subsequently in binders, and methods for making such reinforce d sheets of papers.

BACKGROUND OF THE INVENTION

Some of the new generation high speed copiers may include a duplexing feature whereby the sheets can be printed on both sides. In the printing of the sheets on both sides, and even in the course of using less sophisticated copying machines, it is most desirable that either edge of the paper may be the leading edge of the sheet, even in the case of sheets which have reinforcing along one edge. In accordance with one aspect of the present invention, it has been determined that sheets which are reinforced by strips extending down one side only of the sheets of paper frequently curl at the reinforcing edge. At least in some cases this is believed to be in part a result of the hot roller in the copier machines which engages the paper, and the fact that moisture may be driven out of the exposed side of the reinforced edge of the paper, thereby creating the curl. When the sheet is rapidly moved through the machine to the next station, with a curled leading edge, it acts as an air foil and is deflected to one side. The copier machine guides may then miss the leading edge of the sheet and the copier machine will jam.

In addition to the problem of edges curling, it is important that the reinforcing not be unduly thick, and that it be smooth and slippery so that the individual sheets of paper feed smoothly. More specifically, if there is any portion of the paper which is unduly thick, the machines tend to jam. Accordingly, any lack of symmetry in the reinforcing strips, as well as any stickiness or lack of a smooth slick surface can cause jamming of new high speed copying machines.

A principal object of the present invention, therefore, is to provide reinforced sheets of paper which will not jam the new generation of high speed copying machines.

SUMMARY OF THE INVENTION

In accordance with one specific illustrative method by which the present invention may be implemented, reinforced curl-free sheets of paper which will not jam the new generation of copying machines may be formed by the following steps:
1. Hot melting of adhesive.
2. Hot coating of adhesive on ½ mil thick Mylar or other low friction polymer film, on wide rolls of film, for example, more than one foot wide.
3. Cooling and hardening of the coated adhesive.
4. Rolling up the adhesive coated film.
5. Slitting and rolling 9/16 or ½ inch wide coated film.
6. Heating and applying strips of the reinforcing plastic film along both sides of and may be slightly spaced from one edge of 8½ inches wide paper stock.
7. Cutting the reinforced paper into sheets.
8. Punching holes through the reinforced portion of the paper sheets for 3-ring binders.
9. Supplying the curl-free reinforced sheets to high speed copying machines.
10. Inserting the reinforced sheets with copied material thereon into binders.

In accordance with a somewhat broader aspect of the invention, reinforced curl-free sheets of paper may be formed by the simultaneous applying of thin low friction strips of plastic film material to opposite sides of one edge of a sheet of paper in symmetrical and opposed relationship, to preclude the application of curling stresses to the paper.

In accordance with additional features of the invention, the low friction polymer film may be in the order of ½ mil thick, and may be handled with very light tension when it is at elevated temperatures, so that the film is not extended or stressed.

In accordance with a further aspect of the invention, sheets of paper may be provided with a pair of low-friction reinforcing plastic strips in the order of one-half inch wide and about ½ to 1½ mils thick mounted spaced from the edge of the sheets by up to ⅛ inch, with the strips mounted symmetrically top and bottom along one edge of the sheets on both sides of the sheets to minimize curling stresses.

Other objects, features and advantages of the present invention will become apparent from a consideration of the following detailed description and from the accompanying drawings.

BRIEF DESCRIPTION OF THE DRAWINGS

FIG. 1 is a schematic diagram showing one technique for applying adhesive to thin polymeric films;

FIG. 2 is a diagrammatic showing of an important step involved in coating both sides of one edge of a roll of paper symmetrically with thin strips of Mylar film;

FIG. 4 shows a sheet of an 8½ inch by 11 inch paper sheet coated as indicated in FIGS. 2 and 3 and cut into sheets and punched;

FIG. 5 is a schematic side view of the end of a strip of Mylar reinforcing tape and provided with an adhesive coating, prior to application to the paper;

FIG. 6 is a side view of a sheet of paper provided with a pair of symmetrically located Mylar reinforcing strips bonded by adhesive to the edge of the sheet of paper;

FIG. 7 indicates schematically one of the new generation of copier machines which moves sheets of paper through its copying process at very high speeds;

FIG. 8 shows the curled leading edge of prior types of reinforced paper sheets with reinforcing strips on one side only; and FIG. 9 is a comparable showing of paper provided with the new two-sided type of reinforcing.

DETAILED DESCRIPTION

Figure 3:
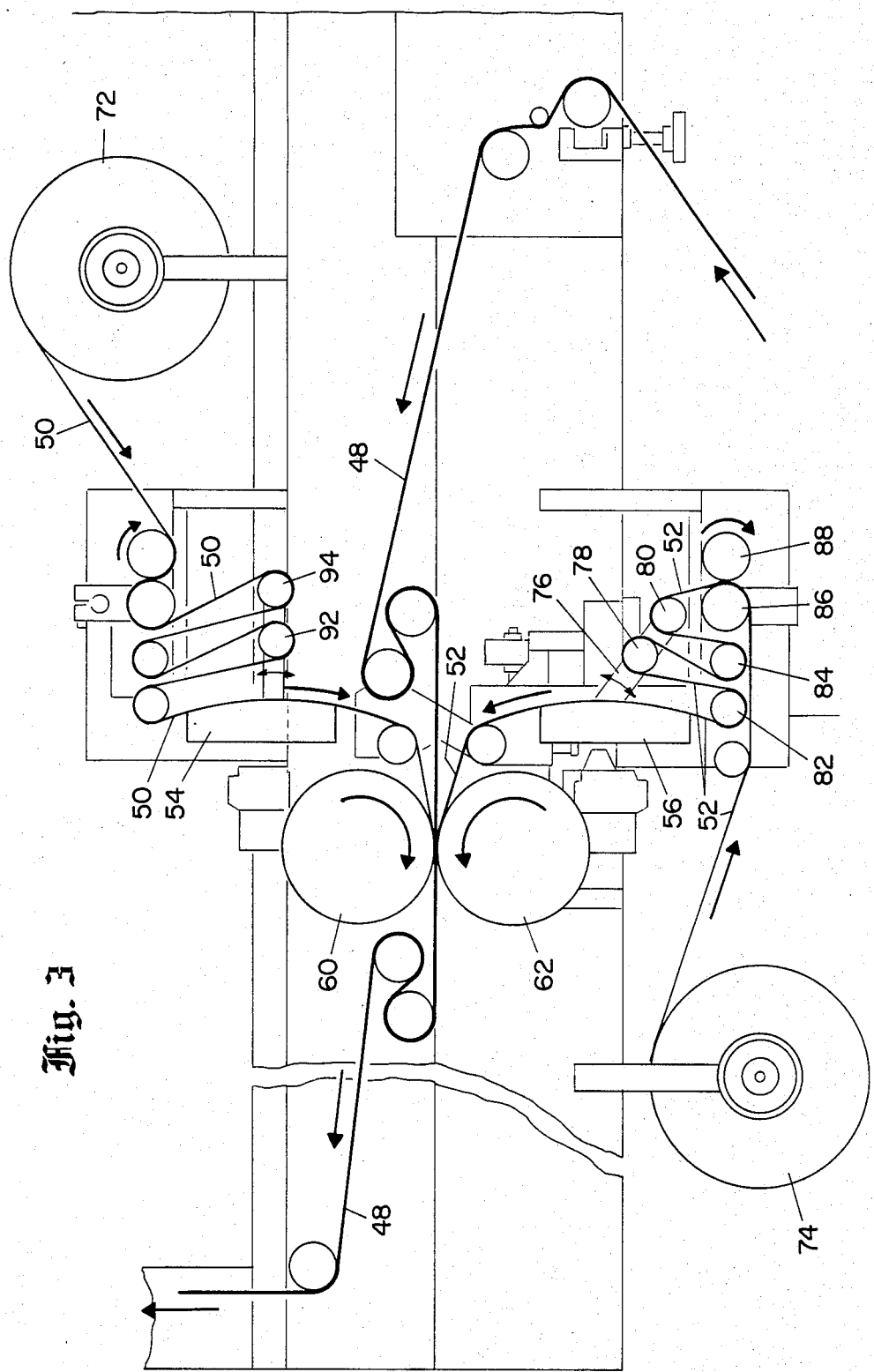
FIG. 3 is a side view of one typical machine which may be employed to accomplish the coating step indicated schematically in FIG. 2.

Referring more particularly to the drawings, FIG. 1 is a schematic diagram showing the steps in making thin strips of coated "Mylar" or biaxially oriented polyethylene terephthalate, which is a type of polyester film. Incidentally, "Mylar" is a trademark of DuPont. It should also be noted that the present invention is not limited to Mylar, but may use polyethylene terephthalate manufactured under other tradenames, or other thin, low friction, plastic films.

In FIG. 1, an input roll of polyester film 12 is shown at the upper left-hand corner of the figure. The other input to the process of FIG. 1 is adhesive material shown schematically by the box 14. The adhesive which is selected should have good adhesion to both the polyester or Mylar material 12, as well as to paper. Accordingly, good polymeric adhesive should be employed, and one excellent adhesive is polyethylene vinyl acetate, often referred to as "E.V.A.". A Suitable polyethylene vinyl acetate adhesive may be purchased from Swift Company, of Jackson, Tenn. This adhesive softens at between 200 degrees F. and 350 degrees F., and in FIG. 1 the hot melt adhesive is shown being held in the liquid condition in the vat 16. The hot melt adhesive 34 is supplied by a pump 18 through conduit 20 to a tube 22 which is provided with a slot along its lower periphery in engagement with the Mylar film 12 which is advanced under the coating conduit 22 by the feed rollers 24 and 26. A suitable catch channel 28 is provided to receive any drippings from the conduit 22 at the end of the film 12. A cold roller 30 is provided to lower the temperature of the coated film and to solidify it prior to being rolled up again as indicated again at 32 in FIG. 1.

As indicated toward the top in FIG. 1, the adhesive material 34 is coated toward the center of the Mylar film 12, and extends outwardly to within about ⅛ of an inch of the two sides of the film. However, to avoid coating extending over the edges of the Mylar film 12, the outer edges are trimmed off at a later step so that all of the thin strips of polymer film tape are uniformly coated with adhesive, and none of the adhesive carries over the side edges of the tape or onto the uncoated surface thereof.

The wide adhesive coated polyester film 32 is now slitted in the slitting unit 36 which may be of any of several conventional types. Slitting units such as the slitter 36 characteristically operate at a slower speed such as 50 or 100 feet per minute, as compared with the higher coating speeds in the order of 500 feet per minute which may be used for the coating process shown diagrammetically to the left in FIG. 1. For this reason the slitting process is shown separately toward the right in FIG. 1. Incidentally, the slitter 36 may be of any conventional type, such a an Arrow surface drive slitter or a Stanford center wind machine. In the slitter 36, the 30 inch wide adhesive coated Mylar film is trimmed at the edges and is cut into strips approximately 9/16" or ½ inch wide and rolled up on individual smaller reels 38 which may, for example, hold 5,000 or 6,000 feet of coated adhesive strips, as compared with the original roll of film 12 which might be 20,000 feet long and eighteen inches in diameter.

Following the preparation of the individual reels 38 of tape, they may be shipped to individual plants adjacent selected markets, where the adhesive tape may be applied to paper to produce the final reinforced paper sheets as described in greater detail below.

Referring now to FIGS. 2 and 4 of the drawings, the final product as shown in FIG. 4 will be a reinforced sheet of paper 42 with two symmetrically located strips of relatively low friction reinforcing tape 44 (only one of which is shown in FIG. 4) mounted near or at one edge of the sheet, and with perforations 46 extending through the paper sheet and the two layers of reinforcing to receive binder rings or pins.

The technique for applying the reinforcing tape along one edge of a roll of paper is indicated schematically in FIG. 2. In FIG. 2, a roll of paper 48 is fed from right to left as shown in FIG. 2, and two strips of Mylar film 50 and 52 are fed past the pre-heaters 54 and 56, respectively, and into engagement with opposite sides of the lower edge 58 of the paper web 48, as it is fed past the heated rollers 60 and 62 which apply the polyester tapes 50 and 52 symmetrically to opposite sides of the web paper 48. The rollers 64 and 66 are shown in FIG. 2 as guiding the thin strips of reinforcing polyester material to the heated rollers 60 and 62. Incidentally, the paper web 48 may be 8½ inches wide for subsequent cutting into 8½ inch by 11 inch sheets, such as those shown in FIG. 4.

Now, referring to FIG. 3, the machine which performs the function indicated schematically in FIG. 2 is shown in substantially greater detail. Specifically, it may initially be noted that the two tapes 50 and 52 bear the same reference numerals in FIG. 3 as in FIG. 2, with the coated polymer film tape 50 being fed from the reel 72, and the other adhesive coated film strip 52 being fed from the reel 74. Incidentally, each of the reels 72 and 74 are provided with a slight drag to prevent substantial overrunning when the operation stops. In this regard, it may be noted that the speed of operation is normally in the order of 150 feet per minute.

It may also be noted that, with a polymer or polyester film such as Mylar, when very thin film is heated to a temperature in the order of 250 degrees F. to 350 degrees F. by the preheaters 54 and 56 in order to activate the adhesive coating, the film easily stretches if it is subject to any substantial tension. Further, if the film is applied to the paper in the heated condition and is stretched, it is likely to contract on cooling, and cause buckling of the paper to which it has been applied. It has been determined that at the temperatures which are involved here, and with film which is only one-half of one thousandth of an inch in thickness, it is undesirable to have tension of more than about ½ pound per transverse inch of the film. Accordingly, with film approximately ½ inch or about 9/16th inch wide, a tension in the order of ¼ pound or so is desirable. In order to achieve this special low tension on a consistent basis and still operate the system at a moderately high speed such as the 150 feet per minute previously mentioned, special tensioning arrangements are provided. These special tensioning arrangements include the pivoted arm 76 with the two rollers 78 and 80 mounted thereon, and the associated fixed rollers 82 and 84, together with the drive rollers 86 and 88. A relatively light upward biasing force is applied to the pivoted arm 76 with its associated rollers 78 and 80 so that the proper light amount of tension is maintained on the polyester strip 52. This assembly is known as a "dancer roll" tensioning assembly and serves to provide the light amount of tensioning required for the present purposes.

A similar "dancer roll" assembly including the two rollers 92 and 94 are involved in the proper tensioning of the upper polyester strip 50 as it is unwound from the reel 72 and is led past the heater 54. The function of the other guide rollers and drive rollers as shown in FIG. 1 are generally conventional and accordingly, will not be considered in detail in the present description.

It is again emphasized that a very important feature of the present invention is the symmetrical and substantially identical mode of placing the two reinforcing strips along the edge of the paper. In the event that there is a significant difference in the mode of application of the two reinforcing strips to the paper, the result is likely to be that the edge of the paper will curl, and may jam the new generation of high speed copying machines as the sheets of paper are moved rapidly with the reinforced edge leading. This has proved to be a serious problem heretofore and it may be positively solved either by the concurrent identical application of the two reinforcing strips by an apparatus as shown in FIG. 3 of the present drawings, or by very careful quality control using successive application of the two reinforcing strips under identical conditions, first to the top of the paper and subsequently to the lower surface of the paper. However, in the event that, between the successive steps, the paper is exposed to significant changes in humidity, so that the exposed side either gains or loses moisture, even this type of change can be sufficient to cause paper curl, and subsequent malfunction or jamming of the copier machine. Accordingly, the concurrent application of the two reinforcing tapes is to be preferred.

Following the steps shown in FIGS. 2 and 3, the extended web 48 of paper, with the reinforcing strips in place on both sides of one edge thereof, is cut into sheets, normally 8½ by 11 inches, and perforated, to produce sheets of the type indicated in FIG. 4 of the drawings.

FIG. 5 of the drawings is a schematic showing of the edge of one of the strips of Mylar reinforcing, coated with adhesive material. In FIG. 5 the Mylar is designated by the reference numeral 102 and the adhesive by the reference numeral 104. As mentioned hereinabove, the Mylar is preferably about ½ mil, or 0.0005 inch thick. However, its thickness may range from slightly less than ½ mil up to about 2 mils in thickness. In addition, the hot melt adhesive 104 may range from about 0.3 mil to about 1 mil in thickness.

As mentioned hereinabove, it is most important that the paper feed smoothly and that none of the adhesive or other sticky material be exposed to engage adjacent sheets of paper which would otherwise interfere with the smooth initial feeding and subsequent high speed transport of the paper through the new generation high speed copying machines.

Accordingly, the strips of polyester reinforcing are preferably located slightly back from the edge of the paper, for example, in the order of 1/32nd of an inch, so that they cannot extend beyond the edge of the paper in the event of slight errors in placement of the strip, but also provide fully adequate reinforcing for the binder holes, which are normally located so that their outermost edge is about 3/16ths inch from the edge of the paper.

FIG. 6 is a side view showing schematically the edge of the paper sheet 42 to which the reinforcing Mylar strips 44 and 44' have been applied.

With regard to the zones 106 and 106' as shown in FIG. 6, these are the areas where adhesive such as that shown at 104 in FIG. 5 have been impregnated into the outer surfaces of the paper 42. Thus, although the total thickness of the adhesive coated Mylar may be substantially greater than that of the Mylar per se, when these reinforcing strips are firmly applied to the paper after the adhesive has been heated and softened, the overall thickness of the paper sheets themselves are only increased by approximately the thickness of the reinforcing Mylar layer itself and not by the additional thickness of the adhesive which substantially penetrates the outer surface of the paper.

FIG. 7 is a schematic diagram of one of the new generation of copier machines, such as the Xerox copier machines, models Nos. 8200, 9400, 9500, and similar copying apparatus manufactured by Xerox and other manufacturers. As mentioned above, these machines involve the high speed movement of the sheets of paper; and it is important that either edge of reinforced sheets of paper may be the leading edge. The stack of input sheets of paper 112 appears at the left-hand end of the overall apparatus which is diagrammatically indicated by the block 114. Two subsequent stages of the copying process are schematically indicated by the reference numerals 116 and 118. As mentioned hereinabove, these sheets are projected at high speeds through the apparatus. When the old type of reinforcing was employed, as indicated by FIG. 8, the reinforcing was on one side only, and the paper tended to curl, as indicated in FIG. 8. This may be a result of the intense heat which is applied to the sheets of paper at some points during the copying process, perhaps to fix the toner, and this may have the result of driving off some moisture from one side of the paper where it is not possible to drive off the water from the other portion of the paper because of the coating. This has unexpectedly created the problem of curling the front edge of the paper, thus creating an air foil effect and deflecting the paper as it is rapidly shifted from one stage of the copier to another, causing the machine to jam. On the other hand, as shown in FIG. 9, when the reinforcing is symmetrically located on both sides of the edge of the sheets of paper, no curling occurs, and the rapid transmission of the paper through the copier machines does not create any problem.

Incidentally, for completeness, several prior art patents which show pertinent reinforcing structures include F. Thomas, U.S. Pat. No. 2,039,752 granted May 5, 1936; J. Selden, U.S. Pat. No. 1,769,395; G. C. Garraway, U.S. Pat. No. 1,977,794 granted Oct. 23, 1934; J. Mattivi, U.S. Pat. No. 1,439,253 granted Dec. 19, 1922, and Swiss Pat. No. 332,824 granted Nov. 15, 1958. While some of these patents have some superficial similarity to applicant's proposed arrangements, none of them are suitable for solving the problem of the high speed processing of reinforced sheets of paper. Thus, for example, the translucent varnish proposed by Thomas for reinforcing would provide a finish which would be unduly sticky and unduly thick to work satisfactorily in the new generation of copiers. With regard to the Mattivi patent, U.S. Pat. No. 1,439,253, the reinforcing is unduly thick, and is impractical on the basis of folding a single film back over on itself to provide the double coating. The Selden U.S. Pat. No. 1,769,395 is typical of prior proposed arrangements where the reinforcing is on one side only of the sheet. Concerning the Swiss patent, it appears to have a reinforcing element which is not only not symmetrical, but which also extends beyond the edge of the paper and is relatively thick. Accordingly, none of the known prior art reinforcing arrangements are suitable for the purposes described in the present specification, nor do they anticipate applicant's claimed arrangements or methods.

In the foregoing detailed description, one method of coating the reinforcing strip material was described. This used the hot melt process. Instead of this preferred hot melt process, other processes employing either solvents to dissolve the adhesive, or utilizing an aqueous dispersion of the adhesive could be employed. In either case, the result, prior to slitting, would be the same, with a coating of adhesive on the rolls of Mylar or other low friction reinforcing material. In addition, pressure sensitive adhesives could be employed; however, they would require protection by the use of backing tape and a release layer if they are to be transported from the point of fabrication to the point where they are applied to the paper. Alternatively, the adhesive could be applied in liquid form immediately prior to application to the paper. However, in the interests of careful control and avoiding the presence of any sticky material on the exposed surfaces of the sheets of material, the types of processes where heat activated adhesive is located on and strictly confined to one surface only of the polyester material, are to be preferred. It is also noted that other types of reinforcing material may be employed instead of polyethylene terephthalate. Specifically, for example, polyethylene and polypropylene could be used. However, the reinforcing material, such as other polymer films, must be relatively smooth, thin, and may not have a high coefficient of friction significantly greater than the paper, which might prevent free feeding of the copies of material through the copying machine. Thus, for example, where dipping in varnish or the like has been proposed for reinforcing, the result would tend to be an unduly thick edge to the sheets of paper and also a relatively sticky surface when two of these dipped edges were adjacent one another, so the resultant product would not be suitable for the application in the new generation of copiers, as discussed herein. Accordingly, in view of the foregoing discussion, the present invention is clearly not limited to the specific embodiment and processes described in detail hereinabove.

What is claimed is:

1. A process for making and using reinforced non-jamming paper sheets in high speed copying machines comprising the steps of:
    coating wide rolls of low friction polymer film one-thousandth of an inch or less in thickness, with a thin layer of heat activated adhesive one thousandth of an inch or less in thickness;
    cooling the adhesive coated film to harden the adhesive;
    rolling the coated film up;
    slitting the rolls of coated film into thin strips in the order of one-half inch wide;
    rolling up the thin strips of adhesive coated film;
    heating the thin strips of adhesive coated film to activate the adhesive;
    applying the thin strips of preheated coated film simultaneously to both sides of the paper near but slightly spaced from one edge of the paper, to avoid asymmetric stressing of the edges of the paper, thereby preventing curling thereof;
    cutting the double-side reinforced paper into sheets; and
    feeding the reinforced sheets of paper into a high speed copier machine;
    whereby the double side reinforced paper is substantially curl-free and does not jam the copier machines.

2. A process as defined in claim 1 wherein said coating and successive steps involving low friction polymer film are accomplished using polyethylene terephthalate.

3. A process as defined in claim 1 wherein said adhesive coating step involves the coating of ethylene vinyl acetate adhesive.

4. A process as defined in claim 1 including the additional steps of punching holes through the reinforced areas of the sheets, and securing the sheets into a binder.

5. A process as defined in claim 1 including the step of maintaining the strip material at low tension, less than one pound, as the preheated strips are applied to the paper.

6. A process as defined in claim 1 including the step of maintaining the strip material at low tension, less than one-half pound, as the preheated strips are applied to the paper.

7. A process for making and using reinforced non-jamming paper sheets in high speed copying machines comprising the steps of:
    coating wide rolls of low friction polymer film one-thousandth of an inch or less in thickness with a thin layer of adhesive one thousandth of an inch or less in thickness;
    slitting the adhesive coated film into thin strips in the order of ⅜ inch to ¾ inch wide;
    rolling up the thin strips of coated film;
    applying the thin strips of adhesive coated film simultaneously to both sides of the paper near but slightly spaced from one edge of the paper, to avoid asymmetric stressing of the edges of the paper, thereby preventing curling thereof;
    cutting the double-side reinforced rolls of paper into sheets;
    punching holes through the reinforcing and the paper; and
    feeding the reinforced sheets of paper into a high speed copier machine;
    whereby the double side reinforced paper is substantially curl-free and does not jam the copier machines.

8. A process as defined in claim 7 wherein said coating and successive steps involving low friction polymer film are accomplished using polyethylene terephthalate.

9. A process as defined in claim 7 wherein said adhesive coating step involves the coating of polyethylene vinyl acetate adhesive.

10. A process for making and using reinforced non-jamming paper sheets in high speed copying machines comprising the steps of:
    preparing thin strips of adhesive coated low friction polymer film one-thousandth of an inch in thickness or less, and having a coating of adhesive one thousandth of an inch or less, in thickness thereon;
    applying the thin strips of adhesive coated film in substantially the same manner to both sides of the paper near but slightly spaced from one edge of the paper, to avoid asymmetric stressing of the edges of the paper, thereby preventing any substantial curling thereof;
    cutting the double-side reinforced paper into sheets;
    punching holes through the reinforcing film and the paper;
    whereby the edges of the double side reinforced paper are substantially curl-free, even when subject to varying ambient conditions.

11. A process as defined in claim 10 wherein said coating and successive steps involving low friction polymer film are accomplished using polyethylene terephthalate.

* * * * *